May 27, 1958   G. E. HENNING   2,835,927
METHODS OF PRODUCING CELLULAR PLASTICS
Filed May 7, 1953

INVENTOR
G. E. HENNING
BY
ATTORNEY

United States Patent Office 2,835,927
Patented May 27, 1958

2,835,927

METHODS OF PRODUCING CELLULAR PLASTICS

George E. Henning, Baltimore, Md., assignor to Western Electric Company, Incorporated, New York, N. Y., a corporation of New York Application May 7, 1953, Serial No. 353,548

4 Claims. (Cl. 18—59)

This invention relates to methods of producing cellular plastics, and more particularly to methods of producing extruded coverings of cellular plastics upon filamentary cores.

This application is a continuation-in-part of my copending application Serial No. 306,822, filed August 28, 1952 for "Methods of and Apparatus for Extruding Cellular Plastics," now Patent No. 2,766,480.

In the manufacture of conductors having insulating coverings of a cellular form of a plastic, such as cellular polyethylene, solid polymers of ethylene mixed with a heat decomposable blowing agent may be continuously extruded as a sheath upon a conductor moving through an extrusion die. As the tubular sheath of polyethylene issues from the die, the gas evolved by heat-decomposition of the blowing agent mixed therewith expands the sheath into a cellular form containing a multiplicity of minute, blown cells uniformly distributed throughout the sheath. In the expanded polyethylene sheath the percentage of occluded gas may vary from about 25% up to about 75% by volume. A value of approximately 50% by volume of gas is considered very desirable, but the preferred gas content is above 50% and may approach 60%.

In order to achieve uniformity of physical and electrical characteristics in the extruded cellular insulation, the percentage of occluded gas, as well as the size and distribution of the minute blown cells in which the gas is occluded, must be controlled accurately. It has been found that the creation of a back pressure within the extruder is beneficial in achieving such control. One procedure for obtaining such back pressure is disclosed and claimed in my aforementioned copending application Serial No. 306,822, now Patent No. 2,766,480. When the percentage of gas occluded within the extruded product must be high and must fall within a limited range of values, the expansion of the gas must be controlled very closely.

An object of the invention is to provide new and improved methods of and apparatus for producing cellular plastics.

Another object of the invention is to provide new and improved methods of and apparatus for producing extruded coverings of cellular plastics upon filamentary cores.

A method illustrating certain features of the invention may include the steps of advancing a mixture of a plastic compound and an expanding agent through a very short path which is highly restricted circumferentially, the periphery of said path conforming in longitudinal cross-section to a conic section, and then advancing the mixture abruptly into a nonrestricted region whereby the agent expands the mixture into a cellular form having a high percentage of occluded gas therein.

An apparatus illustrating certain features of the invention may include an extrusion head having a passageway extending therethrough, an extrusion die mounted at one end of the passageway, a plug mounted in the passageway adjacent to the die, the periphery of the plug being provided with a plurality of small grooves through which the plastic compound passes for restricting the flow of plastic compound to create a back pressure within the passageway, and means for forcing such a plastic compound through the passageway, the grooves, and the die, said die having an axial orifice which is very short and highly restricted circumferentially, the periphery of said orifice conforming in longitudinal cross-section to a portion of a conic section.

A clear understanding of the invention may be obtained from the following detailed description, when read in conjunction with the accompanying drawing, in which.

Figure 1:
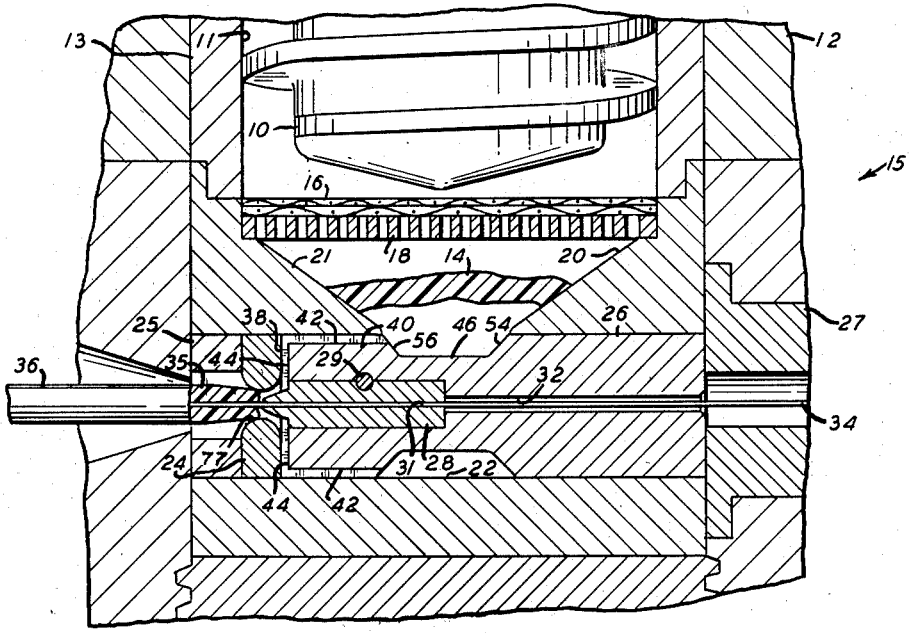
Fig. 1 is a fragmentary, horizontal section of apparatus forming one embodiment of the invention designed to be utilized in performing methods embodying the invention.

Referring to Fig. 1, a stock screw 10 is disposed longitudinally for rotation within a cylindrical bore 11 of an extrusion cylinder 12 having a liner 13. Means (not shown) is provided for positively rotating the stock screw to knead and advance a mass 14 of a plastic compound toward a delivery end of the extrusion bore 11, where an extrusion head 15 is secured. The plastic compound fed into the bore 11 may be a mixture of granular polyethylene, a heat decomposable blowing agent, such as dinitroso pentamethylene tetramine, and other suitable ingredients, such as plasticizers, stabilizers and pigments.

Mounted transversely across the delivery end of the extrusion bore 11 is a straining screen 16 supported upon a backing plate 18. After passing through the straining screen 16 and the backing plate 18, the mass 14 of the plastic compound enters a tapered passageway 20 formed in a cylindrical, centrally apertured block 21. The passageway 20 diminishes gradually in cross-section as it leads from the extrusion bore 11 to a chamber 22 formed internally of the block 21. At the left-hand end of the chamber 22, as seen in Fig. 1, an extrusion die 24 abuts a spacer 25 secured within the extrusion head 15. The right-hand end of the chamber 22 is occupied by a core tube holder 26 secured within the extrusion head 15 by means of a bushing 27.

A core tube 28 is held in position within the core tube holder 26 by means of a pin 29. The core tube 28 is mounted in axial alignment with an orifice 77 extending through the center of the die 24. An axial passageway 31 extending through the core tube 28 is aligned with an axial passageway 32 extending through the core tube holder 26, so that a filamentary conductive core 34, such as a copper-clad steel wire, may be advanced continuously through these passageways, from right to left as viewed in Fig. 1. The bushing 27 functions as a wire guide at the entrance end of the apparatus, and the core tube 28 guides the continuously advancing core 34 so that it will pass through the axial center of the orifice 77 in the die 24.

While the plastic compound is being advanced through the interior of the extrusion cylinder 12, the compound is subjected to high pressure and it is heated above the temperature at which the blowing agent decomposes. Under these conditions, the gas generated by decomposition of the blowing agent is forced to dissolve in the hot plastic compound, and the gas remains dissolved in the compound while the compound is moved through the extrusion head 15. The pressure is suddenly released as the compound issues from the die 24, allowing the gas to expand the compound into a cellular form characterized by the presence of a multiplicity of discrete, minute, gas filled cells uniformly distributed throughout the compound.

By means of the die 24 the plastic compound is continuously formed into a tubular sheath 35 surrounding the advancing core 34. Beyond the die 24 the expansion of the sheath 35 on the core 34 produces an insulated conductor 36, which is then advanced directly through a cooling means (not shown) in which the temperature of the insulating sheath 35 is reduced. A capstan of known design (not shown) provides the pulling force necessary to advance the core 34 through the extrusion head 15 and the cooling means.

The core tube holder 26 completely occupies the right-hand end of the chamber 22. In the left-hand end of the chamber 22, the core tube holder 26 is provided with a transversely flat face 38 which abuts the die 24. This end of the core tube holder is formed into a cylindrical plug 40 having a plurality of longitudinal grooves 42—42 spaced equally about its periphery. The longitudinal grooves 42—42 lead to a plurality of radial grooves 44—44 formed in the end face 38. Intermediate its ends the core tube holder 26 is reduced in size circumferentially thereof, thereby forming a cylindrical reduced portion 46 in the zone adjacent to the exit end of the tapered passageway 20. Thus, a portion of the unoccupied portion of the chamber 22 resembles a hollow annulus positioned at the exit end of the tapered passageway 20.

On both sides of its cylindrical reduced portion 46 the core tube holder 26 is chamfered, forming a conical portion 54 which closes the right hand end of the unoccupied portion of the chamber 22, and a conical portion 56 at the left hand end of the chamber 22. When the flowing mass 14 of the plastic compound reaches the core tube holder 26, the compound flows around the cylindrical reduced portion 46, over the conical portion 56 and enters the longitudinal grooves 42—42. The cylindrical plug 40 occupies all of the portion of the chamber 22 adjacent to the die 24, except for the relief provided by the longitudinal grooves 42—42 and the radial grooves 44—44, so that all the plastic compound advanced through the chamber 22 passes through these grooves before reaching the die 24.

The mass 14 of the plastic compound is advanced by the stock screw 10 through the tapered passageway 20 into the remaining annular portion of the chamber 22. The flow of the compound is then split into a plurality of small streams which flow through the longitudinal grooves 42—42, and thence through the radial grooves 44—44. The core tube 28 protrudes from the core tube holder 26 in the center of the radial grooves 44—44. The mass of plastic compound flowing through the radial grooves 44—44 converges upon the protruding core tube 28, and becomes formed into a unitary conical stream as the compound enters the orifice 77 in the die 24.

A considerable back pressure is built up within the extrusion head 15 by blocking the exit end of the chamber 22 with the cylindrical plug 40, so that all of the advancing plastic compound 14 must flow through the grooves 42—42 and 44—44 therein to escape from the chamber. The walls of the grooves 42—42 and of the grooves 44—44 present frictional resistance to the passage of the plastic compound being forced around the cylindrical plug 40 through these grooves. These grooves may be square in cross-section, or they may assume other configurations, for example, they may be semicircular or V-shaped. The back pressure built up in this manner contributes greatly to the successful extrusion of the compound. Methods and apparatus involving the creation of such high back pressure are fully described and claimed in my aforesaid copending application Serial No. 306,822, now Patent No. 2,766,480.

The configuration and dimensions of the extrusion die and of the core tube contribute materially toward success in controlling the expansion of extruded cellular plastics. One type of die found to be particularly useful is the die 24 illustrated in Figs. 1 and 2. This die is generally cylindrical in shape, with its orifice 77 comprising identical bell-mouthed entrance and exit portions on opposite sides of its throat 30. The identical bell-mouthed entrance and exit portions of the die 24 meet at the throat 30. Viewing the die 24 as a disc having an axial orifice 77, the wall of the orifice for its entire length describes a semicircle having a radius equal to half the thickness of the disc.

It is evident that the length of the die 24 is extremely short in comparison with the usual length of any conventional die used to extrude plastics. In one working embodiment of the invention, the die 24 had a length of ¼ inch, its orifice 77 was bounded by a wall semicircular in longitudinal cross-section having a radius of ⅛ inch, and the throat 30 at the most restricted region of the orifice 77 had a diameter of about .073 inch. In this same instance, the cylindrical plug 40 has a length of about ½ inch, a diameter of about 9/16 inch, and it has eight longitudinal grooves semicircular in cross-section, each having a radius of about 3/64 inch. In many cases the use of a larger number of grooves, each having a smaller size, may be even more desirable.

*Second embodiment*

Figures 2, 3, 4:
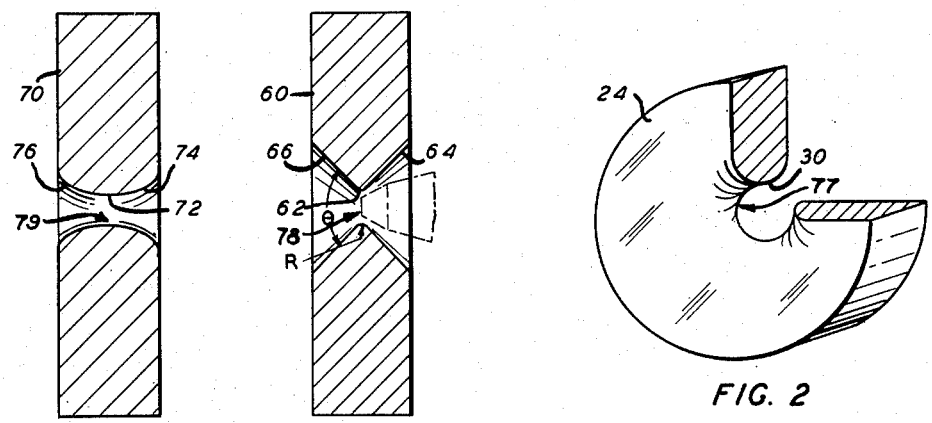
Fig. 2 is a perspective view, partially in section, of an extrusion die forming a portion of the apparatus shown in Fig. 1.
Fig. 3 is a vertical section of a second form of extrusion die which may be used in the apparatus shown in Fig. 1.
Fig. 4 is a vertical section of a third form of extrusion die which may be used in the apparatus shown in Fig. 1.

Fig. 3 illustrates a die 60 designed to be incorporated into a second embodiment of the invention, in the same way that the die 24 is associated with the apparatus shown in Fig. 1. The die 60 has the shape of a disc provided with an axial orifice 78 having an throat 62 which is highly restricted circumferentially thereof. The walls of both the entrance 64 and the exit 66 are subtantially frustoconical in shape, are both subtantially defined by frustums of right circular cones having an apex angle $\theta$ and meet at the midpoint of the orifice 78 to form the throat 62.

A longitudinal section of the space included in the orifice 78 resembles that of a double cone and has approximately an hourglass shape. That is, the hollow frustums forming the frustoconical entrance and exit meet along a common boundary which corresponds with the top of each frustum, and the bases of the frustums lie on opposite sides of their common boundary. The restricted throat 62 is the junction of the entrance 64 with the exit 66. The portions of the entrance 64 and the exit 66 just adjacent to the throat 62 form in longitudinal cross-section two arcs of two circles having radii R.

The angle $\theta$ is made large enough to allow the tip end of a core tube, similar in construction to the core tube 28 shown in Fig. 1, to protrude into the entrance 64 and be positioned close to the die 60, as is shown in dotted lines in Fig. 3. In one working embodiment of the invention, the angle $\theta$ had a value of about 96°, the radius R had a value of about .031 inch, the diameter of the throat 62 was about .070 inch, and the length of the die 60 was about .180 inch.

*Third embodiment*

A die 70, illustrated in Fig. 4, is designed for use in a third embodiment of apparatus of the type shown in Fig. 1. The die 70 has the shape of a disc provided with an axial orifice 79 having an entrance 74 and an exit 76 located at opposite ends of the die. In longitudinal cross-section the orifice 79 approximates a portion of an elliptical curve. The diameter of the throat 72 as well as the length of the orifice 79 correspond to the dimensions of the die 24 shown in Figs. 1 and 2. The throat 72 is at the midpoint of the orifice 79 lengthwise. The opposite ends of the orifice 79 are rounded and conform to the same elliptical curve that generates the surface of the interior of the orifice.

The configuration in longitudinal cross-section of the orifices of such short dies may vary from the semicircular shape of the die 24 to any shape described by a conic section, such as a parabola, a hyperbola or an ellipse. Such a cross-section may also be roughly that of a pair of triangles joined at their apices, such as would be obtained by taking a longitudinal section along the axis of a double cone. The term "conic section," as used herein and in the annexed claims, is intended to embrace all these types of sections, but does not include a longitudinal section of a half cone (generally called a cone). The entrance and exit ends of the throats of such dies may at times be formed by the curve generated by the conic section, or the entrance and exit may be rounded off to conform to supplementary radii.

Short, highly restricted dies, such as the dies 24, 60 and 70, illustrated in Figs. 1 and 2, 3 and 4, respectively, are highly useful in extruding cellular plastic insulation onto a filamentary electrical conductor. However, the principal advantages of such dies are realized in the extrusion of products lacking a conductive core, such as video string, which is employed as a filler in video cables used to transmit television programs. Instead of having a conductive core, such string may be composed of a cellular plastic compound strengthened by a strong filamentary core composed of glass strands, or the like. Video string is generally limp and flexible in comparison with a copper wire covered by a cellular plastic compound.

In extruding a covering of cellular insulation onto a filamentary copper wire being advanced continuously through an extruder, the wire is kept under tension by a capstan which pulls the wire through the extruder. It is evident that the speed at which the tensioned wire is advanced through the extruder can be controlled accurately by such means. It is important to be able to control the speeds at which this wire advances, since the rate at which the wire moves in relation to the rate at which the insulation is extruded thereon, affects the wall thickness of the insulation as well as the gas content of the insulation. However, in the extrusion of coreless products, or video string, the product being extruded cannot be tensioned adequately to control its speed effectively. In the case of video string the glass strands in its core might abrade each other and thereby cause breakage if high tension were applied to the core. Lacking such tension control for video string, the diameter and the gas content of the extruded product are apt to vary widely.

The short restricted dies embodied in the present invention make it possible to exercise great control over the dimensions and the gas contents of extruded cellular plastics. An outstanding feature of the invention is that it is possible to obtain a very high percentage of gas occluded within an expanded product having uniformly distributed cells of minute size and having good cell wall structure. Cellular insulation of good quality containing as much as 75% by volume of gas may be obtained by using the dies embodied in the invention, whereas the dies of more conventional design previously used were incapable of producing products having a high percentage of gas in which the size of the cells therein was uniform and the cell wall structure was good.

Although the rate at which a filamentary core may be advanced through an extruder is determined to a large extent by the wall thickness of the sheath of insulation being extruded thereon, other factors also must be considered. For example, the rate at which the stock screw plasticizes and delivers the plastics compound likewise controls the rate at which an insulated core can be produced. Using filamentary cores having diameters ranging from about .016 inch up to about .051 inch to produce cellular polyethylene insulated conductors having outside diameters ranging from about .031 inch up to about .300 inch, the cores may be advanced through the extruders at speeds ranging from about 50 feet per minute to about 1,000 feet per minute.

Using a stock screw having a diameter of about 3¼ inches to extrude a polyethylene compound onto a filamentary core having a diameter falling within this range and being advanced through a die having a throat with a diameter ranging from about .019 inch up to about .093 inch, a pressure head of as much as 6,000 pounds per square inch may be built up behind the cylindrical plug 40 on the left-hand end of the core tube holder 26. This high pressure head makes it possible for the gas generated by heat decomposition of the blowing agent within the extruder to become dissolved and to be held dissolved in the hot plastic compound, without expanding the compound prior to the time the compound flows past the tip of the core tube 28.

Methods and apparatus embodying the invention make it possible to exert a very flexible control over the dimensions and the percentage of gas in products extruded thereby. By exercising the proper control over such factors as the rate at which a core is advanced through the die, the rate at which the stock screw extrudes the plastic compound, and the percentage of blowing agent in the plastic compound, the same extrusion die can be used to obtain products having widely different dimensions and percentages of gas therein. Similarly, dies having throats of different diameters may be used to extrude products having the same diameter or the same gas content by controlling other variable factors. An outstanding feature of the invention is the great range through which these factors may be varied.

A die constructed like the die 24 and provided with a throat .052 inch in diameter produced an extruded sheath of excellent quality .097 inch in diameter and containing 42% gas covering a core .036 inch in diameter, while the core was being advanced at the rate of 210 feet per minute. In this instance, it was calculated that the plastic compound was extruded at the rate of 18.9 pounds per hour, and the ratio of the average rate at which the compound was extruded to the rate at which the core was advanced had a value of 3.35. When the same core was advanced through the same die at 450 feet per minute, the extruded sheath produced was .069 inch in diameter and it contained 32% gas, and the ratio of the average speed of the compound to the speed of the core had a value of 1.67. A similar die having a throat .056 inch in diameter used to extrude video string, gave a satisfactory product .090 inch in diameter and containing about 50% gas, when 9 glass strands formed the core of the string.

For production on a commercial scale, the stock screw used usually has a diameter of 2 inches, 3¼ inches or 4½ inches, although larger screws could be used. The pitch of the threads on the stock screw may be relatively long in order to cause the plastic compound to be advanced rapidly through the extrusion bore, or the treads may have a shorter pitch to advance the compound less rapidly while kneading it and building up a high pressure therein. It is evident that the rate of delivery of the extruded product, as well as the degree of throttling required of the grooved plug 40 on the core tube holder 26, are integrally related to the type of stock screw selected. From about 20 up to about 60 pounds per hour of cellular polyethylene can be delivered by extruders having such stock screws.

In a short die of the type embodied in the invention, the highly restricted throat of the die provides a smaller effective free area in which the static pressure of the plastic compound is unusually low. Since the compound then emerges immediately from the die into an atmosphere under relatively low pressure, it is possible for the decomposing blowing agent to effect a sudden and great change in the volume of the compound. In apparatus embodying the invention the die structure allows the plastic compound to advance abruptly from a region of restriction into a region in which the compound is unconfined, thereby producing extruded insulation having a high percentage of occluded gas.

In the first embodiment of the invention, illustrated in Figs. 1 and 2, a high back pressure is built up within the extrusion head 15 as the advancing plastic compound 14 flows through the restricting grooves 42—42 and 44—44 around the cylindrical plug 40. The compound is forced to advance at a high velocity under a low static pressure as it passes around the plug 40. A second zone of higher pressure and reduced velocity occurs within the entrance to the orifice 77 in the die 24. In the throat 30 the flow of the compound is restricted greatly, resulting in a second zone of high velocity and low static pressure. Due to the curvature and the short length of this die, the compound then engages abruptly from the confinement of the die and is allowed to expand rapidly as the gas evolved by decomposition of the blowing agent transforms the compound into its cellular form.

The second embodiment of the invention, in which the die 60 illustrated in Fig. 3 is incorporated, operates in a manner quite similar to the first embodiment. The advancing plastic compound is restricted circumferentially at the juncture of a pair of oppositely disposed frustoconical channels, the entrance 64 and the exit 66 being the said channels and the throat 62 being the juncture of the channels. It is evident that the most significant change in the volume of the plastic compound occurs in the smallest distance and the shortest time in this instance. The throat 62 in reality merely constitutes a boundary between a wide-angled converging channel which communicates with a similar wide-angled diverging channel. Hence, the change in the volume of the plastic compound is most abrupt in this embodiment of the invention.

In the third embodiment of the invention, in which the die 70 illustrated in Fig. 4 is used, the advancing plastic compound is restricted circumferentially to conform to a portion of an elliptical curve within the orifice 79 of this die. The region of restriction decreases gradually in diameter from the entrance 74 to the throat 72 which is at the midpoint lengthwise of the orifice 79, and then increases gradually in diameter from the throat 72 to the exit 76 of this die. The path of the compound is very short in the elliptical restricted region, and then the compound issues immediately into a region of nonconfinement in which the blowing agent causes the plastic compound to expand suddenly.

In extruding insulation containing blown cells onto filamentary conductive cores using the extrusion dies included in apparatus embodying the invention, care must be taken to see that the extruded insulation is concentric with the core it covers. It may be advisable to provide the extruder with a suitable means for controlling the concentricity. Under some circumstances such control may be achieved by modifying the internal structure of the extrusion head, in the manner described in my aforesaid copending application Serial No. 306,822.

In order to take full advantage of the principle of operation of the invention, the extent to which the flow of the plastic compound is restricted should be as great as possible just prior to the moment the compound issues abruptly into the nonrestricted region. Due to such restriction, when a filamentary core is being advanced through such a die, the plastic compound being extruded onto the advancing core may even be forced to travel considerably faster than the core in the throat of the die. As a practical matter, the permissible extent of restriction is limited by the fact that the extruded insulation might be blown away from the core under extreme conditions of high pressure and restriction.

It should be noted that when the throat of such an extrusion die is highly restricted and the plastic compound is extruded through this throat at a high speed, the surfaces of the extruded product are apt to be rough. Hence, when it is important for the surfaces of extruded products to be slick and smooth, such operating conditions must be avoided. However, many products, such as video string, are not required to have smooth surfaces, and in such instances dies having highly restricted throats may be used advantageously.

Manifestly, extrusion dies having other suitable configurations could be devised to achieve results equivalent to those obtainable from the dies described herein. It is merely necessary that such other dies should make it possible to perform the essential steps of methods embodying the invention, namely, forcing a plastic compound containing a blowing agent through a very short and highly restricted region, and then advancing the compound into a nonrestricted region in which the gas generated by the blowing agent readily and suddenly expands the compound into a cellular form having a high percentage of occluded gas therein. The basic method may be varied by causing the path in which the compound flows through the highly restricted region to conform circumferentially to portions of various conic sections, such as circles, ellipses, parabolas, hyperbolas and double cones.

Methods and apparatus embodying the invention are applicable in the extrusion of other plastic compounds, such as polyvinyl chloride and polystyrene compounds, in addition to the polyethylene compounds mentioned specifically. In general, thermoplastic compounds rather than thermosetting compounds are contemplated. Furthermore, other blowing agents, such as diazoamine benzene, may be substituted for the dinitroso pentamethylene tetramine specified in the foregoing description.

What is claimed is:

1. The method of extruding a covering of expanded plastic onto a continuously advancing filamentary core, which comprises the steps of forcing a mixture of plastic compound and an expanding agent around the advancing core and through an orifice having a longitudinal cross-section of a conic section and being so highly restricted circumferentially at a portion therein as to cause the ratio of the linear speed of the extruded compound as it is extruded to the linear speed of the advancing core to be approximately 1.67 or greater, and abruptly subjecting the covered core to a pressure drop after passing through the most highly restricted portion of the orifice to cause the agent to expand the mixture into a cellular form having a high percentage of occluded gas therein.

2. The method of claim 1 in which the periphery of the orifice conforms in longitudinal cross-section to a semicircular curve.

3. The method of claim 1 in which the periphery of the orifice conforms in longitudinal cross-section to an elliptical curve.

4. The method of claim 1 in which the periphery of said orifice is shaped so that in longitudinal cross-section it converges in wide angled frustoconical fashion until it reaches a rounded restricted portion and then diverges abruptly in similar wide angled frustoconical fashion.

References Cited in the file of this patent

UNITED STATES PATENTS

| | | |
|---|---|---|
| 1,586,737 | Geyer | June 1, 1926 |
| 1,700,208 | Paisseau | Jan. 29, 1929 |
| 2,308,638 | Balthis et al. | Jan. 19, 1943 |
| 2,341,731 | MacGregor et al. | Feb. 15, 1944 |
| 2,354,260 | Haney et al. | July 25, 1944 |
| 2,444,831 | Kilborn | July 6, 1948 |
| 2,512,506 | Saint Denis | June 20, 1950 |
| 2,560,778 | Richardson | July 17, 1951 |
| 2,573,440 | Henning | Oct. 30, 1951 |
| 2,692,406 | Rhodes et al. | Oct. 26, 1954 |

FOREIGN PATENTS

| | | |
|---|---|---|
| 629,668 | Great Britain | Sept. 26, 1949 |